(12) United States Patent
Ekeroth et al.

(10) Patent No.: US 11,313,262 B2
(45) Date of Patent: Apr. 26, 2022

(54) CONTROL OF A CENTRIFUGAL SEPARATOR

(71) Applicant: Alfdex AB, Landskrona (SE)

(72) Inventors: Mats Ekeroth, Landskrona (SE); Magnus Wide, Mölnlycke (SE)

(73) Assignee: ALFDEX AB, Landskrona (SE)

( * ) Notice: Subject to any disclaimer, the term of this patent is extended or adjusted under 35 U.S.C. 154(b) by 535 days.

(21) Appl. No.: 16/321,298

(22) PCT Filed: Aug. 17, 2017

(86) PCT No.: PCT/EP2017/070864
§ 371 (c)(1),
(2) Date: Jan. 28, 2019

(87) PCT Pub. No.: WO2018/036906
PCT Pub. Date: Mar. 1, 2018

(65) Prior Publication Data
US 2019/0162089 A1  May 30, 2019

(30) Foreign Application Priority Data

Aug. 25, 2016 (EP) .................................... 16185689

(51) Int. Cl.
*F01M 13/04* (2006.01)
*B04B 5/08* (2006.01)
(Continued)

(52) U.S. Cl.
CPC ............. *F01M 13/04* (2013.01); *B01D 45/14* (2013.01); *B04B 5/08* (2013.01); *B04B 5/12* (2013.01);
(Continued)

(58) Field of Classification Search
CPC ........... F01M 13/04; F01M 2013/0422; F01M 11/10; B01D 45/14; B04B 9/02; B04B 9/10; B04B 5/08; B04B 5/12; B04B 2005/125
See application file for complete search history.

(56) References Cited

U.S. PATENT DOCUMENTS 4,244,513 A  1/1981 Fayer et al.
4,515,582 A  5/1985 Cox-Smith et al.
(Continued)

FOREIGN PATENT DOCUMENTS

CN  85105765 A  1/1987
CN  1272071 A  11/2000
(Continued)

OTHER PUBLICATIONS

Morio et al., Device and method for controlling refrigerating cycle (JP2001183017), Jul. 2001 (Machine translation obtained from Google patents Jul. 2021) (Year: 2001).*

(Continued)

*Primary Examiner* — Robert Clemente
(74) *Attorney, Agent, or Firm* — Birch, Stewart, Kolasch & Birch, LLP

(57) ABSTRACT

A centrifugal separator for cleaning gas containing contaminants includes a stationary casing enclosing a separation space through which a gas flow is permitted, a gas inlet extending through the stationary casing and permitting supply of the gas to be cleaned, a rotating member including a plurality of separation members arranged in said separation space and being arranged to rotate around an axis of rotation, a gas outlet configured to permit discharge of cleaned gas and including an outlet opening through a wall of the stationary casing, a drainage outlet configured to permit discharge of liquid impurities separated from the gas to be cleaned and an electrical motor for rotating the rotating (Continued)

member. The centrifugal separator further includes a control unit configured to control the operation of the electrical motor and to drive the electrical motor in at least two different operational modes and to further switch between operational modes depending at least on information of at least one measured internal parameter of the electrical motor.

20 Claims, 3 Drawing Sheets

(51) Int. Cl.
  *B04B 5/12* (2006.01)
  *B04B 9/10* (2006.01)
  *B01D 45/14* (2006.01)
  *B04B 9/02* (2006.01)

(52) U.S. Cl.
  CPC .................. *B04B 9/02* (2013.01); *B04B 9/10* (2013.01); *B04B 2005/125* (2013.01); *F01M 2013/0422* (2013.01)

(56) References Cited

U.S. PATENT DOCUMENTS

| | | | |
|---|---|---|---|
| 4,791,942 | A | 12/1988 | Rickett et al. |
| 6,783,571 | B2 | 8/2004 | Ekeroth |
| 8,657,908 | B2 | 2/2014 | Eliasson |
| 8,794,222 | B2 | 8/2014 | Schwandt et al. |
| 8,807,097 | B2 | 8/2014 | Schwandt et al. |
| 10,512,919 | B2 | 12/2019 | Eliasson |
| 10,532,365 | B2 | 1/2020 | Eliasson |
| 2003/0048087 | A1* | 3/2003 | Schulter ............... H02H 7/0851 318/471 |
| 2003/0049134 | A1* | 3/2003 | Leighton ............. F04D 29/2222 417/40 |
| 2003/0233932 | A1 | 12/2003 | Ekeroth |
| 2003/0233939 | A1 | 12/2003 | Szepessy et al. |
| 2004/0226442 | A1 | 11/2004 | Olsson et al. |
| 2005/0007046 | A1 | 1/2005 | Schneider et al. |
| 2005/0087336 | A1 | 4/2005 | Surjaatmadja et al. |
| 2006/0048761 | A1* | 3/2006 | Ekeroth ................. F01M 11/10 123/572 |
| 2009/0025562 | A1 | 1/2009 | Hallgren et al. |
| 2012/0174537 | A1 | 7/2012 | Törnblom et al. |
| 2012/0174541 | A1 | 7/2012 | Törnblom et al. |
| 2013/0067873 | A1 | 3/2013 | Szepessy et al. |
| 2013/0233290 | A1 | 9/2013 | Skoog |
| 2014/0045669 | A1 | 2/2014 | Osawa et al. |
| 2014/0237961 | A1 | 8/2014 | Szepessy |

FOREIGN PATENT DOCUMENTS

| | | | |
|---|---|---|---|
| CN | 1671952 | A | 9/2005 |
| CN | 1327931 | C | 7/2007 |
| CN | 101203319 | A | 6/2008 |
| CN | 201493176 | U | 6/2010 |
| CN | 102470378 | A | 5/2012 |
| CN | 102612411 | A | 7/2012 |
| CN | 103301957 | A | 9/2013 |
| CN | 103357218 | A | 10/2013 |
| CN | 103357518 | A | 10/2013 |
| CN | 103917497 | A | 7/2014 |
| CN | 104303279 | A | 1/2015 |
| CN | 105188947 | A | 12/2015 |
| CN | 106232237 | A | 12/2016 |
| CN | 106232238 | A | 12/2016 |
| EP | 1136 131 | A2 | 9/2001 |
| EP | 1136 131 | A3 | 3/2002 |
| EP | 2 883 947 | A1 | 6/2015 |
| EP | 2 980 373 | A1 | 2/2016 |
| GB | 2 116 752 | A | 9/1983 |
| GB | 2 401 564 | A | 11/2004 |
| JP | 1-34660 | B2 | 7/1989 |
| JP | 2-152566 | A | 6/1990 |
| JP | 3-293045 | A | 12/1991 |
| JP | 10-128158 | A | 5/1998 |
| JP | 2001183017 | * | 7/2001 |
| JP | 2005-530096 | A | 10/2005 |
| JP | 2005-530947 | A | 10/2005 |
| JP | 2013-537280 | A | 9/2013 |
| JP | 2015-123444 | A | 7/2015 |
| JP | 2002519183 | A | 7/2020 |
| KR | 10-2008-0020620 | A | 3/2008 |
| RU | 2315872 | C2 | 1/2008 |
| RU | 2317429 | C2 | 2/2008 |
| RU | 2424039 | C2 | 7/2011 |
| RU | 2428241 | C2 | 9/2011 |
| RU | 2469796 | C2 | 12/2012 |
| RU | 2500481 | C1 | 12/2013 |
| RU | 2518921 | C1 | 6/2014 |
| RU | 2522834 | C2 | 7/2014 |
| WO | WO 99/16550 | A1 | 4/1999 |
| WO | WO 2004/001200 | A1 | 12/2003 |
| WO | WO 2004/001201 | A1 | 12/2003 |
| WO | WO 2007/094724 | A1 | 8/2007 |
| WO | WO 2007/094725 | A1 | 8/2007 |
| WO | WO 2007/094726 | A1 | 8/2007 |
| WO | WO 2009/126094 | A1 | 10/2009 |
| WO | WO 2010/008342 | A1 | 1/2010 |
| WO | WO 2011/053224 | A1 | 5/2011 |
| WO | WO 2013/067245 | A1 | 5/2013 |
| WO | WO 2014/155613 | A1 | 10/2014 |
| WO | WO 2014/177579 | A1 | 11/2014 |

OTHER PUBLICATIONS

English translation of the Russian Decision to Grant and Search Report, dated Sep. 13, 2019, for Russian Application No. 2019108052.
English translation of Korean Office Action for Korean Application No. 10-2019-7008013, dated Apr. 20, 2020.
English translation of Korean Office Action for Korean Application No. 10-2019-7008014, dated Apr. 20, 2020.
U.S. Office Action for U.S. Appl. No. 16/321,244, dated Jun. 30, 2021.
China Electric Power Press, "Professional Examination Review Guidebook of Qualification Examination for Registered Electrical Engineers in Power Distribution Major," Jun. 30, 2007, 1st Edition, pp. 538-543 (7 pages total).
English translations of the Chinese Office Action and Search Report, dated Jun. 2, 2020, for Chinese Application No. 201780051602.1.
English translations of the Chinese Office Aclion and Search Report, dated Jun. 3, 2020, for Chinese Application No. 201780051617.8.
English translations of the Russian Office Action and Search Report, dated May 30, 2019, for Russian Application No. 2019108083.
Written Opinion of the International Searching Authority and International Search Report, dated Nov. 27, 2017, for International Application No. PCT/EP2017/070862.
International Search Report (PCT/ISA/210) issued in PCT/EP2017/070864, dated Oct. 30, 2017.
Written Opinion (PCT/ISA/237) issued in PCT/EP2017/070864, dated Oct. 30, 2017.
Office Action issued in Japan Patent Application 2019-510913 dated Feb. 25, 2020.
European Communication pursuant to Article 94(3) EPC for European Application No. 16185689.3, dated Sep. 18, 2020.
Office Action issued in Japan Patent Application No. 2019-510923, dated Feb. 17, 2020.
Chinese Notice of Allowance and Search Report for corresponding Chinese Application No. 201780051602.1, dated Jan. 6, 2022, with English translation.
Chinese Office Action, dated Feb. 20, 2021, in Application No. 201780051602.1.
Industrial Electronics, Huang Congliang, Scholars Books Co., Ltd., pp. 473-474, Sep. 30, 1986, 1st edition).

(56) References Cited

OTHER PUBLICATIONS

Translation of Japanese Office Action, dated Feb. 25, 2020, in Application No. 2019-510913.

* cited by examiner

CONTROL OF A CENTRIFUGAL SEPARATOR

FIELD OF THE INVENTION

The present invention relates to the field of centrifugal separators for cleaning a gas containing liquid impurities. In particular, the present invention relates to cleaning crankcase gases of a combustion engine from oil particles.

BACKGROUND OF THE INVENTION

It is well known that a mixture of fluids having different densities may be separated from one another through use of a centrifugal separator. One specific use of such a separator is in the separation of oil from gas vented from a crankcase forming part of an internal combustion engine.

With regard to this specific use of separators, there can be a tendency for the high pressure gas found in the combustion chambers of an internal combustion engine to leak past the associated piston rings and into the crankcase of the engine. This continuous leaking of gas into the crankcase can lead to an undesirable increase of pressure within the crankcase and, as a consequence, to a need to vent gas from the casing. Such gas vented from the crankcase typically carries a quantity of engine oil (as droplets or a fine mist), which is picked up from the reservoir of oil held in the crankcase.

In order to allow vented gas to be introduced into the inlet system without also introducing unwanted oil (particularly into a turbocharging system wherein the efficiency of the compressor can be adversely affected by the presence of oil), it is necessary to clean the vented gas (i.e. to remove the oil carried by the gas) prior to the gas being introduced into the inlet system. This cleaning process may be undertaken by a centrifugal separator, which is mounted on or adjacent the crankcase and which directs cleaned gas to the inlet system and directs separated oil back to the crankcase. An example of such a separator is disclosed e.g. in U.S. Pat. No. 8,657,908. The centrifugal separator may be driven by e.g. a turbine wheel, rotated by means of an oil jet from the lubrication oil system of the combustion engine, or by an electrical motor.

However, a diesel engine on e.g. a truck may have a varied workload, everything between an idling engine at standstill to full torque when driving up a hill fully loaded. Thus, there is a need in the art for convenient arrangements that can adapt the operation of the centrifugal separator to the engine's demand for cleaning the crankcase gas.

SUMMARY OF THE INVENTION

A main object of the present invention is to provide an electrically driven centrifugal separator for cleaning gas having a simplified operational control.

As a first aspect of the invention, there is provided a centrifugal separator for cleaning gas containing contaminants, the centrifugal separator comprising a stationary casing, enclosing a separation space through which a gas flow is permitted, a gas inlet extending through the stationary casing and permitting supply of the gas to be cleaned, a rotating member comprising a plurality of separation members arranged in the separation space and being arranged to rotate around an axis (X) of rotation, a gas outlet configured to permit discharge of cleaned gas and comprising an outlet opening through a wall of the stationary casing, a drainage outlet configured to permit discharge of liquid impurities separated from the gas to be cleaned;

an electrical motor, for rotating the rotating member; and wherein the centrifugal separator further comprises a control unit which is configured to control the operation of the electrical motor and to drive the electrical motor in at least two different operational modes and to further switch between operational modes depending at least on information of at least one measured internal parameter of the electrical motor.

The contaminants in the gas may comprise liquid impurities, such as oil, and soot.

Consequently, the centrifugal separator may be for separating liquid impurities, such as oil, from gas. The gas may be crankcase gas of a combustion engine. Thus, the centrifugal separator may be adapted for cleaning crankcase gas from a diesel engine, such as a diesel engine on a truck. The separator may further be adapted to be fitted onto an engine, such as a diesel engine. However, the centrifugal separator may also be suitable for cleaning gases from other sources, for instance the environment of machine tools which frequently contains large amounts of liquid impurities in the form of oil droplets or oil mist.

The stationary casing of the centrifugal separator may comprise a surrounding side wall, and first and second end walls, which enclose the separation space. The stationary casing may have a cylindrical shape with circular cross-section having a radius R from the axis (X) of rotation to the surrounding side wall. This radius R may be constant at least with respect to a major part of the circumference of the surrounding side wall. The stationary casing may also be slightly conical. The first and second end walls may thus form an upper end wall and a lower end wall of the cylindrical shaped casing.

The gas inlet of the centrifugal separator may be located through the first end wall or through the surrounding side wall close to the first end wall, thus at the top of the separator, such that gas entering through the gas inlet is directed to the separation space. The drainage outlet may be located in the second end wall, e.g. at the bottom of the separator. Thus, the drainage outlet may be arranged centrally in an end wall opposite the end wall through which, or at which, the inlet is arranged. The drainage outlet of the centrifugal separator may further be formed by a number of spot shaped through holes of the stationary casing or by a single drainage passage. The drainage outlet may be arranged at the axis of rotation or centered on the axis of rotation. The drainage outlet may also be in an annular collection groove at the inner end wall of the stationary casing. The gas outlet may be arranged in a surrounding side wall of the stationary casing or may for example be arranged in an end wall, such as the end wall opposite the end wall through which, or at which, the gas inlet is arranged.

The rotating member is arranged for rotation during operation by means of the electrical motor. The rotating member comprises a plurality of separation members arranged in the separation space. The separation members of the rotating member are examples of surface-enlarging inserts that promote separation of contaminants from the gas. The separation members may thus be arranged to increase the settling area in the separation space. The rotating member may comprise more than 10, such as more than 20, such as more than 50, such as more than 100 separation members. The separation members may be arranged so that two adjacent separation members are spaced apart a distance that is less than 10 mm, such as less than 5 mm, such as less than 2 mm, such as less than 1 mm.

The separation members may be a stack of separation discs. The separation discs of the stack may be frustoconical. A frustoconical disc may have a planar portion extending in a plane that is perpendicular to the axis of rotation, and a frustoconical portion that may extend upwards or downwards. The planar portion may be closer to the rotational axis than the frustoconical portion. Further, the discs of the stack may be radial discs, in which substantially the whole disc extends in a plane that is perpendicular to the axis of rotation.

It is also to be understood that the separation members, such as separation discs, not necessarily have to be arranged in a stack. The separation space may for example comprise axial discs, or plates that extend around the axis of rotation. The axial discs or plates may be planar, i.e. extending in planes that are parallel to the axis of rotation. The axial discs or plates may also have a slightly or significantly curved shape, such as an arcuate or spiral shape, as seen in a radial plane.

During operation, gas to be cleaned may be directed centrally through the plurality of separation members, such as centrally through the stack of separation discs. In such a set-up, the rotating member may further define a central space formed by at least one through hole in each of the separation members. This central space is connected to the gas inlet and configured to convey the gas to be cleaned from the gas inlet to the gaps between the separation members, such as between the gaps between the discs of a stack of separation discs. A separation disc that may be used as separation member may comprise a central, essentially flat portion perpendicular to the axis of rotation. This portion may comprise the through holes that form the central space.

Thus, the centrifugal separator may be configured to lead crankcase gases from the gas inlet into a central portion of the rotating member. In this manner the crankcase gases may be "pumped" from the central portion of the rotating member into the interspaces between the separation discs in the stack of separation discs by the rotation of the rotating member. Thus, the centrifugal separator may work according to the concurrent flow principle, in which the gas flows in the disc stack from a radial inner part to a radial outer part, which is opposite to a separator operating according to the counter-current flow principle, in which the gas is conducted into the centrifugal rotor at the periphery of the rotor and is led towards a central part of the rotor.

The electrical motor may principally be of any suitable kind, for instance a direct-current motor or an alternate-current motor (synchronous motor or asynchronous motor). As an example, the electrical motor may be a synchronous motor, such as a brushless electric motor, having a rotor that includes permanent magnets.

The electrical motor may be arranged within the stationary casing or outside the stationary casing.

Furthermore, an electrical motor which does not have separate bearings for the journaling of the rotor of the motor may be used. The already present and necessary bearings for the rotating part may instead be used for this journaling. As an example, the electrical motor may be arranged within the stationary casing and have a stator that is supported by the stationary casing, and a rotor, that is constituted by part of the rotating member of the centrifugal separator and which is journalled relative to the stator only through the bearings.

Such a configuration is for example explained in more detail in the international patent application published as WO 2004/001201.

The centrifugal separator further comprises a control unit configured to control the operation of the electrical motor. The control unit may comprise a processor and an input/output interface for communicating with the electrical motor and for receiving information from e.g. other parts of the separator, such as from sensors arranged on the separator, and/or from e.g. an engine to which the centrifugal separator is connected or mounted.

The control unit may further comprise computer program products for sending operational requests to the electrical motor. The computer program may be for analysing received information from the engine and send operational requests to the electrical motor based on such analysis. The control unit is at least able to control the electrical motor so that it may drive the separator in at least two operational modes. The operational modes are different from each other, and the control unit may be configured to drive the centrifugal separator in at least two, such as at least three, such as at least four different operational modes. Thus, the control equipment may be configured for driving the electrical motor at different speeds. The control unit may thus be in the same unit as the electrical motor, which may be arranged within the stationary casing or outside the stationary casing. However, the control unit may also be a separate unit than the electrical motor. Thus, the control unit may be a separate unit arranged outside the stationary casing whereas the electrical motor is arranged within the stationary casing, or as an alternative, both the electrical motor and the control unit are arranged outside the stationary casing, but as different units.

The control unit is also configured to switch between such operational modes based on received information of at least one measured internal parameter of the electrical motor. An "internal parameter" is related to the actual operation of the electrical motor and may be a parameter that can vary in time during operation of the electrical motor. Thus, the control unit may be configured to drive the electrical motor in a first operational mode and to measure at least one internal parameter on a continuous basis. If the value of the measured parameter indicates a switch in operational modes, e.g. if the measured value is above or below a certain threshold or within a specific interval, the control unit may switch to drive the electrical motor in another operational mode. However, the control unit may be configured not to switch between operational modes immediately but instead wait to see the temporal behavior of the measured parameter. As an example, if the value of measured internal parameter indicates a switch in operational modes, the control unit may wait a certain time period, such as between 5-30 s, such as between 5-15 s, and if the value of the measured internal parameter still indicates a switch, the control unit may then switch to another operational mode.

The time during which the centrifugal separator is operated in different modes may of course vary and depends on the information of the at least one measured internal parameter.

The control unit may be configured to switch between operational modes depending solely on one or several of such internal parameters, and may also be configured to switch between operational modes depending on one or several of such internal parameters in combination with "external parameters", i.e. parameters that may be related to other parts of the centrifugal separator or to an engine to which the separator is mounted.

Consequently, the centrifugal separator according to the invention is operating in different operational modes and the switch between modes is based at least on internal parameters of the electrical motor. The first aspect of the invention is based on the insight that a separator for treatment of crankcase gas could be controlled into two or more operational modes, such as at two or more pre-determined speeds or two or more pre-determined torque levels. If the separator could automatically adjust e.g. its speed or torque from a nominal level to e.g. one lower and/or one higher level, the separator's workload could be fairly well adapted to an engine's demand for cleaning the crankcase gas. Further, the inventor has found that by measuring one or several internal parameters of the electrical motor driving the separator, it is possible to determine if the separator should remain running at the nominal operational model or be shifted to run in a different mode. It is advantageous to use internal parameters of the electrical motor for controlling the shift between operational modes since they are easily accessible, i.e. the electrical motor does not require the use of external sensors, wires and/or connections to other parts of e.g. the separator or engine to which the separator is mounted for regulating the operation of the separator.

In embodiments of the first aspect of the invention, at least two different operational modes are at least two different driving modes of the electrical motor in which either the torque or the rotational speed of the electrical motor is kept at different constant levels.

Thus, the control unit may be configured to switch between a first constant speed or torque level and depending on the measured internal parameter of the electrical motor, shift to at least one further constant speed or torque level, such as to a second speed or torque level. The control unit may be configured to shift between several different constant speed or torque levels, such as to shift between two, three, four or five or more constant speed or torque levels.

Consequently, the at least two different driving modes may comprise at least two different speed levels in which the rotational speed is kept at different constant levels.

The different speed levels may be constant levels that differ more than 10%, such as more than 20%, such as more than 30%, such as more than 50%.

The different speed levels may be constant levels that differ more than 2000 rpm, such as more than 3000 rpm, such as more than 4000 rpm.

Further, the at least two different driving modes may comprise a first speed level at a first constant rotational speed and a second speed level at a second constant rotational speed, wherein the second constant rotational speed is higher than the first constant rotational speed, and wherein the control unit is configured to switch to the second speed level if the at least one measured internal parameter indicates that there is a higher demand for cleaning the gas when running at the first speed level.

The first constant rotational speed may thus be a nominal speed of the centrifugal separator, whereas the second rotational speed may be a higher speed that is used when there is an increased need for cleaning of crankcase gas.

The first constant rotational speed may thus comprise rotating the rotating member at a speed of between 7.500 and 12.000 rpm, and the second constant rotational speed may be a speed that is more than 10% higher than the first constant rotational speed, such as more than 2000 rpm higher than the first constant rotational speed.

However, it is to be understood that the at least two driving modes may comprise a plurality of different speed levels, such as more than three different speed levels, such as more than five different speed levels.

Further, the at least two different driving modes may further comprise a third speed level at a third constant rotational speed, wherein the third constant rotational speed is lower than the first constant rotational speed, and wherein the control unit is configured to switch to the third speed level if the at least one measured internal parameter indicates that there is a lower demand for cleaning the gas when running at the first speed level.

The third constant rotational speed may be a speed that is more than 2000 rpm lower than the first constant rotational speed, and may thus be used when there is a decreased need for cleaning of crankcase gas. Such decreased need may for example be when the engine to which the centrifugal separator is mounted is at standstill.

In embodiments of the first aspect of the invention, at least two different driving modes comprises at least two different torque levels in which the torque of the electrical motor is kept at different constant levels.

Thus, the control unit may be configured to operate at fixed torque levels whereas the rotational speed may be vary in the different driving modes. As discussed in relation to the different speed levels above, the at least two different driving modes may comprise a first torque level, i.e. a nominal torque level used during normal driving, a second torque level higher than the first level and used when there is an increased need for cleaning of crankcase gas and optionally also a third torque level lower than the first torque level and used when there is a decreased need for cleaning of crankcase gas. However, it is to be understood that the at least two driving modes may comprise a plurality of different torque levels, such as more than three different torque levels, such as more than five different torque levels.

In embodiments of the first aspect of the invention, at least one measured internal parameter of the electrical motor is the electric power consumption of the electrical motor or the electric current through the electrical motor.

Thus, an internal parameter may be or comprise information of the electric power consumption, e.g. absolute power consumption per unit time. The internal parameter may also be the electric current through the electric motor, which thus is linked to the power consumption. The electric current may for example be an absolute amount of current per time unit. The power consumption and the electric current through the electrical motor may increase when there is a higher demand for cleaning of crankcase gas.

In embodiments of the first aspect of the invention, at least one measured internal parameter of the electrical motor is the temporal fluctuations of the electric current through the electrical motor.

The temporal fluctuations of the electric current may be "ripples" in the signal corresponding to the electric current, and may be fluctuations measured that occur in less than a second. The temporal fluctuations may be small periodic variations in the current. It is believed that the temporal fluctuations of the electric current is different when there is a low demand for cleaning of crankcase gas compared to when there is a high demand for cleaning of crankcase gas.

In embodiments of the first aspect of the invention, at least one measured internal parameter of the electrical motor is the temperature of the electrical motor.

Thus, there temperature of the electrical motor may be different when there is a low demand for cleaning of crankcase gas compared to when there is a high demand for cleaning of crankcase gas, and may thus be used as an internal parameter of the electrical motor for regulating in which operational mode the separator should be operated.

In embodiments of the first aspect of the invention, at least one measured internal parameter of the electrical motor is the time from startup of the electrical motor.

Thus, the control unit may be adapted to register the operating time of the electrical motor, and use this parameter to regulate in which operational mode the separator should be operated. As an example, the control unit may be configured to run the separator in an operational mode related to low demand for cleaning the crankcase gas during a time period from startup of the electrical motor. This time period may correspond to a time period from startup of the engine to which the separator is mounted, i.e. a time period during which the engine is idling.

In embodiments of the first aspect of the invention, the control unit is further adapted to switch between operational modes depending at least on information from at least one measured internal parameter of the electrical motor and on information of at least one external parameter that is not related to the electrical motor.

Thus, the control unit may be configured to regulate operating the separator in the different operational modes based both on information about internal parameters of the electrical motor, as discussed above, and on information about one or several external parameters. External parameters may be parameters that are not related to the actual driving of the electrical motor, such as parameters related to the engine to which the separator is mounted or to the actual separator. Thus, the centrifugal separator may comprise one or several sensors for measuring such external parameters and sending information to the control unit about the measured parameter. The sensors may comprise a sensor registering a pressure at the gas inlet and/or gas outlet of the separator.

As an example, at least one external parameter is selected from the pressure at the gas inlet or the temperature of the gas inlet. Thus, the centrifugal separator may comprise a pressure sensor and/or a temperature sensor at the gas inlet, and the control unit may be configured to receive a signal related to the gas pressure and/or temperature at the gas inlet, and regulate driving the separator in the different operational modes depending on at least one internal parameter of the electrical motor and the received information about the gas pressure and/or temperature at the gas inlet.

At least one external parameter may also comprise information related to the age of the engine to which the separator is mounted, since an old engine usually produces more crankcase gas. Thus, in embodiments, the control unit is configured to receive a signal that is related to the time during which an engine to which the centrifugal separator may be connected has been running. The control unit may therefore be configured to take into account the age of the engine when regulating the electrical motor, e.g. so that the electrical motor is driven in an operational mode that represents an increased cleaning of crankcase gas if the engine is old compared to if the engine is new. As an example, if the operational modes are driving modes at different constant speed levels, these constant speed levels may be shifted to higher constant rotational speed levels if the control unit receives information that the engine is above a certain age.

However, it is also to be understood that the control unit may be configured to switch between operational modes depending solely on information of at least one measured internal parameter of the electrical motor.

As a second aspect of the invention, there is provided a method for cleaning gas comprising contaminants, comprising the steps of
providing a centrifugal separator according to the first aspect above,
running the centrifugal separator by driving the electrical motor in a first operational mode,
measuring at least one internal parameter of the electrical motor, and
switching the electrical motor to drive in a second operational mode depending at least on information of the least one measured internal parameter of the electrical motor.

Terms and definitions used in relation to the second aspect of the invention are as discussed in relation to the first aspect of the invention above.

The step of running the centrifugal separator comprises rotating the rotating member of the centrifugal separator.

The method may further comprise the steps of
introducing gas containing contaminants into gas inlet of the centrifugal separator; and
discharging cleaned gas through the gas outlet of the centrifugal separator and discharging contaminants separated from the gas through the drainage outlet of the centrifugal separator.

In embodiments of the second aspect of the invention, the method is further comprising
switching back to driving in the first operational mode depending at least on information of the least one measured internal parameter of the electrical motor.

Thus, during operation of the centrifugal separator, i.e. during running of the engine to which the separator is mounted, the separator may switch back and forth between operational modes, such as back and forth between different speed levels depending on the need for cleaning of crankcase gas, as discussed in relation to the first aspect above.

In embodiments of the second aspect of the invention, a step of switching to another operational mode also depends on information of at least one external parameter that is not related to the electrical motor.

Thus, as discussed in relation to the first aspect above, the step of switching between operational modes may depend both on internal parameters of the electrical motor and on external parameter, such as the gas pressure and/or temperature at the gas inlet of the centrifugal separator.

As a further aspect of the invention, there is provided a computer program product, comprising program code instructions for executing the method according of the second aspect of the invention, when said program is executed by a computer. As an example, the separator control unit may comprise such a computer program product.

DETAILED DESCRIPTION

The centrifugal separator and method according to the present disclosure will be further illustrated by the following description with reference to the accompanying drawings.

Figure 1:
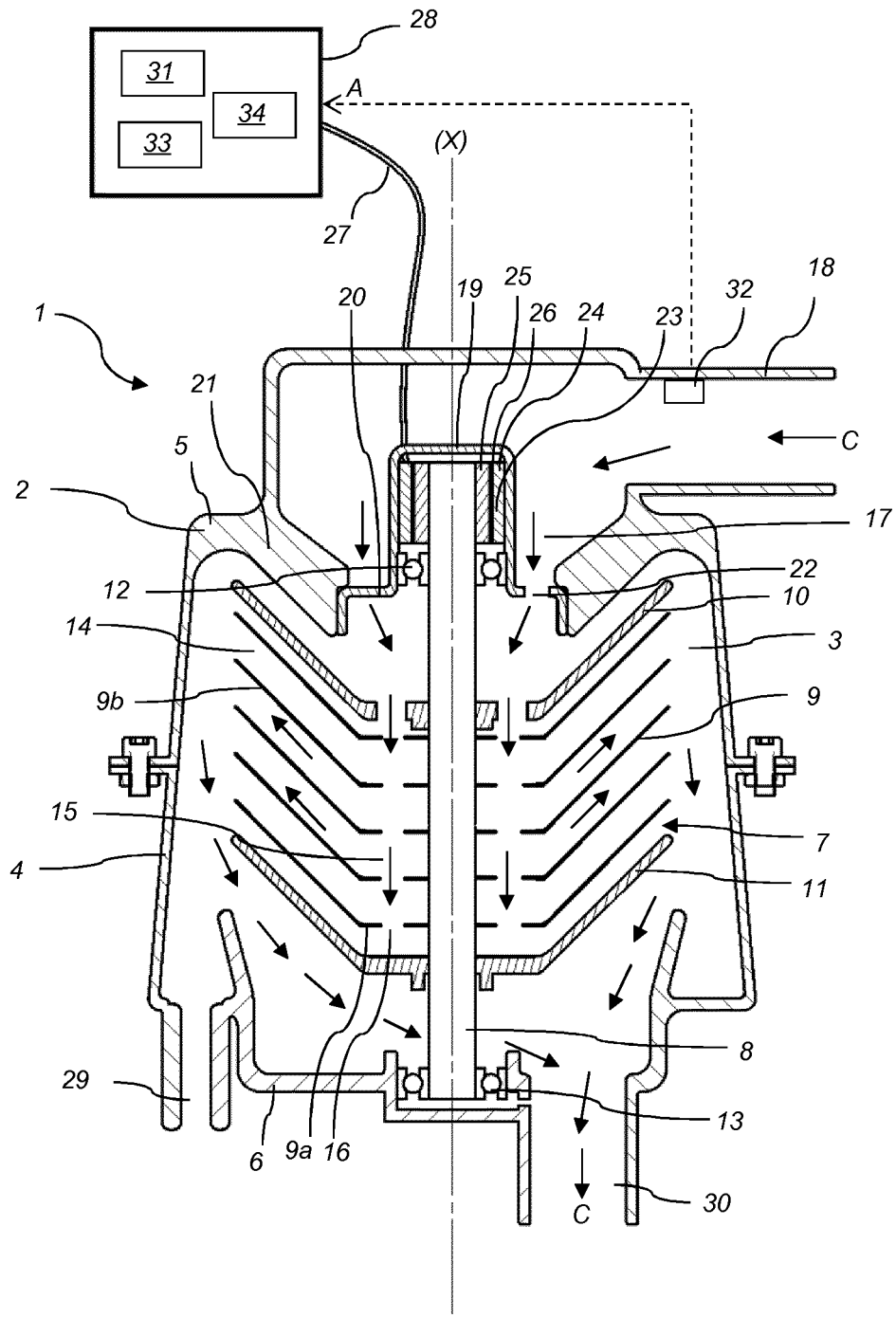
FIG. 1 shows a section of an embodiment of a centrifugal separator.

FIG. 1 shows a section of a centrifugal separator 1 of the separator arrangement. The centrifugal separator 1 comprises a stationary casing 2, which is configured to be mounted to a combustion engine (not disclosed), especially a diesel engine, at a suitable position, such as on top of the combustion engine or at the side of the combustion engine.

It is to be noted that the centrifugal separator 1 is also suitable for cleaning gases from other sources than combustion engines, for instance the environment of machine tools which frequently contains large amounts of liquid impurities in the form of oil droplets or oil mist.

The stationary casing 2 encloses a separation space 3 through which a gas flow is permitted. The stationary casing 2 comprises, or is formed by, a surrounding side wall 4, a first end wall 5 (in the embodiments disclosed an upper end wall) and a second end wall 6 (in the embodiments disclosed a lower end wall).

The centrifugal separator comprises a rotating member 7, which is arranged to rotate around an axis x of rotation. It should be noted that the stationary casing 2 is stationary in relation to the rotating member 7, and preferably in relation to the combustion engine to which it may be mounted.

The stationary casing 2 has a radius from the axis x of rotation to the surrounding side wall 4 that is constant at least with respect to a major part of the circumference of the surrounding side wall 4. The surrounding side wall 4 thus has a circular, or substantially, circular cross-section.

The rotating member 7 comprises a spindle 8 and a stack of separation discs 9 attached to the spindle 8. All the separation discs of the stack 9 are provided between a first end plate 10 (in the embodiment disclosed an upper end plate) and a second end plate 11 (in the embodiment disclosed a lower end plate).

The spindle 8, and thus the rotating member 7, is rotatably supported in the stationary casing 2 by means of a first bearing 12 (in the embodiment disclosed as an upper bearing) and a second bearing 13 (in the embodiments disclosed as a lower bearing), the bearings being arranged one on each side of the stack of separation discs 9. The upper bearing 12 is supported by a cap 19 which by a cylindrical part surrounds an upper end portion of the centrifugal rotor shaft, i.e. the spindle 8, the upper end portion being situated axially above the upper bearing 12. The cap 19 also has an annular plain portion 20, through which the cap is supported by a partition 21 in the stationary casing 2. The plain annular portion 20 of the cap 19 is provided with through holes 22, through which the inlet conduit 18 communicates with the central space 15.

Axially above the upper bearing 12 the cap 19 supports on its inside, around the end portion of the spindle 8, a stator 24 belonging to an electrical motor 23. A rotor 25 belonging to this electrical motor 23 is supported by the end portion of the centrifugal rotor shaft, i.e. the spindle 8. A narrow annular slot 26 is formed between the motor stator 24 and the motor rotor 25. As can be seen, the electrical motor 23 in this embodiment has no bearings of its own, through which its rotor 25 would be rotatably journalled in its stator 24. Instead, the two bearings 12 and 13, through which the rotating member 7 is journalled in the stationary casing 2, are utilized for the journaling of the rotor 25 of the electrical motor 23.

The separation discs of the stack 9 are frusto-conical and extend outwardly and upwardly from the spindle 8. The separation discs thus comprise a flat portion 9a, which extend perpendicularly to the axis of rotation X, and a conical portion 9b, that extend outwardly and upwardly from the flat portion 9a.

It should be noted that the separation discs also could extend outwardly and downwardly, or even radially.

The separation discs of the stack 9 are provided at a distance from each other by means of distance members (not disclosed) in order to form gaps 14 between adjacent separation discs 9, i.e. a gap 14 between each pair of adjacent separation discs 9. The axial thickness of each gap 14 may e.g. be in the order of 1-2 mm.

The separation discs of the stack 9 may be made of plastic or metal. The number of separation discs in the stack 9 is normally higher than indicated in FIG. 1 and may be for instance 50 to 100 separation discs 9 depending of the size of the centrifugal separator.

The rotating member 7 defines a central space 15. The central space 15 is formed by a hole in each of the separation discs 9. In the embodiments of FIG. 1, the central space 15 is formed by a plurality of through holes 16, each extending through the first end plate 10 and through each of the separation discs 9, but not through the second end plate 11. The through holes are arranged in the flat portions 9a of the separation discs.

The centrifugal separator 1 comprises a gas inlet 17 for the supply of the gas to be cleaned. The gas inlet 17 extends through the stationary casing 2, and more precisely through the first end wall 5. The gas inlet 17 communicates with the central space 15 so that the gas to be cleaned is conveyed from the inlet 17 via the central space 15 to the gaps 14 of the stack of separation discs 9. The gas inlet 17 is configured to communicate with the crankcase of the combustion engine, or any other source, via an inlet conduit 18 permitting the supply of crankcase gas from the crankcase to the gas inlet 17 and further to the central space 15 and the gaps 14 as explained above.

The centrifugal separator comprises a drainage outlet 29 configured to permit discharge of liquid impurities separated from the gas and a gas outlet 30 configured to permit discharge of cleaned gas. The drainage outlet is in this embodiment arranged as a conduit in the second end wall 6, but the drainage outlet 29 may also be in the form of through holes arranged in the lower end wall 6 so that separated liquid impurities flow through the second bearing 13 as they are drained from the separation space 3. Furthermore, the gas outlet 30 is in this embodiment arranged in the second end wall 6 at a radial distance that is shorter than the radial distance to the drainage outlet 2, but the gas outlet could also be arranged e.g. in the surrounding side wall 4.

By means of control unit 28, the rotational speed and thereby the cleaning efficiency of the centrifugal separator may be controlled in a suitable way so that a required cleaning of the supplied gas is obtained. This is achieved by means of connection 27, which extend into the casing 1 and further through the cap 14 in to the stator 18 of the motor. This connection 27 could also be used for charging the electrical motor 23 with current. The control unit 30 includes a device for driving the electrical motor 23 at different speeds. Different kinds of devices for speed regulation of motors (both direct-current and alternate-current motors) are well known. For a direct-current motor a simple device for voltage control may be used. For an alternate-current motor various kinds of frequency control equipment may be used.

The control unit 28 may further comprise a communication interface 31, such as a transmitter/receiver, via which it may receive data from the electrical motor and various sensors or the engine to which the separator is connected and further transmit data to the electrical motor 23.

The received data may for instance include data on a measured pressure from a pressure sensor 32 at the gas inlet 17, as indicated by dotted arrow "A. The transmitted data may for instance include a control signal for controlling the speed of the electrical motor 23.

The control unit 28 is further configured to carry out a method for controlling the electrical motor 28 according to embodiments disclosed herein. For this purpose the control unit 28 may comprise a processing unit 33, such as a central processing unit, which is configured to execute computer code instructions which for instance may be stored on a memory 34. The memory 34 may thus form a (non-transitory) computer-readable medium for storing such computer code instructions. The processing unit 33 may alternatively be in the form of a hardware component, such as an application specific integrated circuit, a field-programmable gate array or the like.

In this embodiment, the control unit 28 is a separate unit from the centrifugal separator 1. However, the control unit may also be a part of the separator, such as forming a part of the electrical motor 23. Thus, the control unit with all its functions could be arranged at the electrical motor, such as being connected to the stator 24 supported by the cap 19.

During operation, the rotating member 17 is kept in rotation by supply of current to the electrical motor 23 and contaminated gas, e.g. crankcase gas from the crankcase of an internal combustion engine, is supplied to the gas inlet 17 via conduit 18. This gas is conducted further into the central space 15 and from there into and through the interspaces 14 between the separation discs of the stack 9. As a consequence of the rotation of the rotating member 7 the gas is brought to rotate, whereby it is pumped further on radially outwardly through gaps or interspaces 14.

During the rotation of the gas in the interspaces solid or liquid particles suspended in the gas are separated therefrom. The particles settle on the insides of the conical portions 9b of the separation discs and slide or run after that radially outwardly thereon. When the particles and/or liquid drops have reached out to the outer edges of the separation discs, they are thrown away from the rotor and hit the inner surface of the surrounding wall 4 of the stationary casing 2. The particles continue downwardly along this wall and leave the separation space 3 through the drainage outlet 29, whereas the gas freed from particles and exiting from the stack of separation discs 9 leaves the casing 1 through the gas outlet 30. The path of the gas through the centrifugal separator 1 is schematically shown by arrows "C" in FIG. 1.

As discussed above, the control unit 28 controls the rotational speed of the rotating part by sending signal to the electrical motor 23. In this embodiment, the control unit is configured to control the electrical motor to drive at three different drive modes; a first drive mode having a first constant rotational speed of between 7.500 and 12.000 rpm and which represents a nominal speed of the separator, a second drive mode having a second constant rotational speed that is about 2000 rpm above the first constant rotational speed and a third drive mode having a third constant rotational speed that is about 2000 rpm below the first constant rotational speed.

The following example illustrates how the centrifugal separator operates by switching back and forth between the three driving modes depending on the measured electric current through the electrical motor 23 when the centrifugal separator 1 is connected to a diesel engine of a truck:

1) Starting the Engine Followed by an Idling Engine

As the truck engine is started up, the control unit 28 drives the electrical motor 23 at the first drive mode, i.e. it speeds up to the nominal speed. As the truck engine is idling and the amount of crankcase gas is low the current through the electrical motor 23 is lower, such as below a predetermined threshold. The control unit 28 has further information of the time since starting the electrical motor 23, and based on these information it regulates the electrical motor to drive in the third drive mode, i.e. at a lower constant rotational speed since the amount of crankcase gas produce is relatively low.

2) The Truck Starts to Move

As the truck begins to move, the amount of crankcase gas increases. Consequently the current through the electrical motor 23 increases to keep the actual third constant rotational speed. When getting information of the increased current through the electrical motor 23, the control unit 28 regulates the electrical motor 23 so that it operates in the first drive mode, i.e. so that it rotates in its nominal speed at the first constant speed level.

3) Driving Uphill

If the truck enters the foot of a hill and starts to climb the engine's torque increases. This in turn means that the amount of crankcase gas increases, which leads to a higher power consumption and thus a higher current through the electrical motor 23 to keep the rotational speed at the first constant speed level. In this case, the control unit 28 receives constant information about the increased current through the electrical motor 23 and if the current still is increased after also after a certain time period, such as 10 s, after detecting the start of the increase in current, the control unit 28 regulates the electrical motor 23 so that it operates in the second drive mode, i.e. so that it rotates at the second constant speed level that is above the nominal speed.

4) Normal Driving Again

The truck has now climbed the hill and the amount of crankcase gas is normal again. Hence, the measured current through the electrical motor is decreased and the control unit regulates the electrical motor 23 so that it yet again operates in the first drive mode, i.e. so that it rotates in its nominal speed at the first constant speed level.

5) Idling Again

When the truck stands still, the control unit receives information that a decreased current through the electrical motor 23 is needed to keep the rotational speed at the first constant speed level. If the measured current still is decreased after also after a certain time period, such as 10 s, after detecting the start of the decrease in current, the control unit 28 regulates the electrical motor 23 so that it operates in the third drive mode again, i.e. so that it rotates at the third constant speed level that is below the nominal speed.

In the above example, the switch between the different speed levels is based solely on the internal parameter of the electrical motor 23, i.e. the current through the electrical motor, but the control unit 28 may also in addition use information from sensor 32, i.e. information from the gas pressure at the gas inlet 17, for deciding if the speed level should be switched. As an example, the control unit may switch to a higher speed level if the measured current through the electrical motor 23 and the gas pressure at the gas inlet increases, and may switch to a lower speed level if the measured current through the electrical motor and the gas pressure at the gas inlet decreases.

An electrical motor 23 of the kind shown in FIG. 1 may alternatively be arranged around an extension of the spindle 8 below the lower bearing 13. It is also possible to arrange the motor in a space axially between the upper bearing 12 and the first end plate 10 or axially between the lower bearing 13 and the second end plate 11. An electrical motor having a disc-formed circular rotor and a stator formed so that it is situated axially on both sides of the rotor may also be used.

Figure 2:
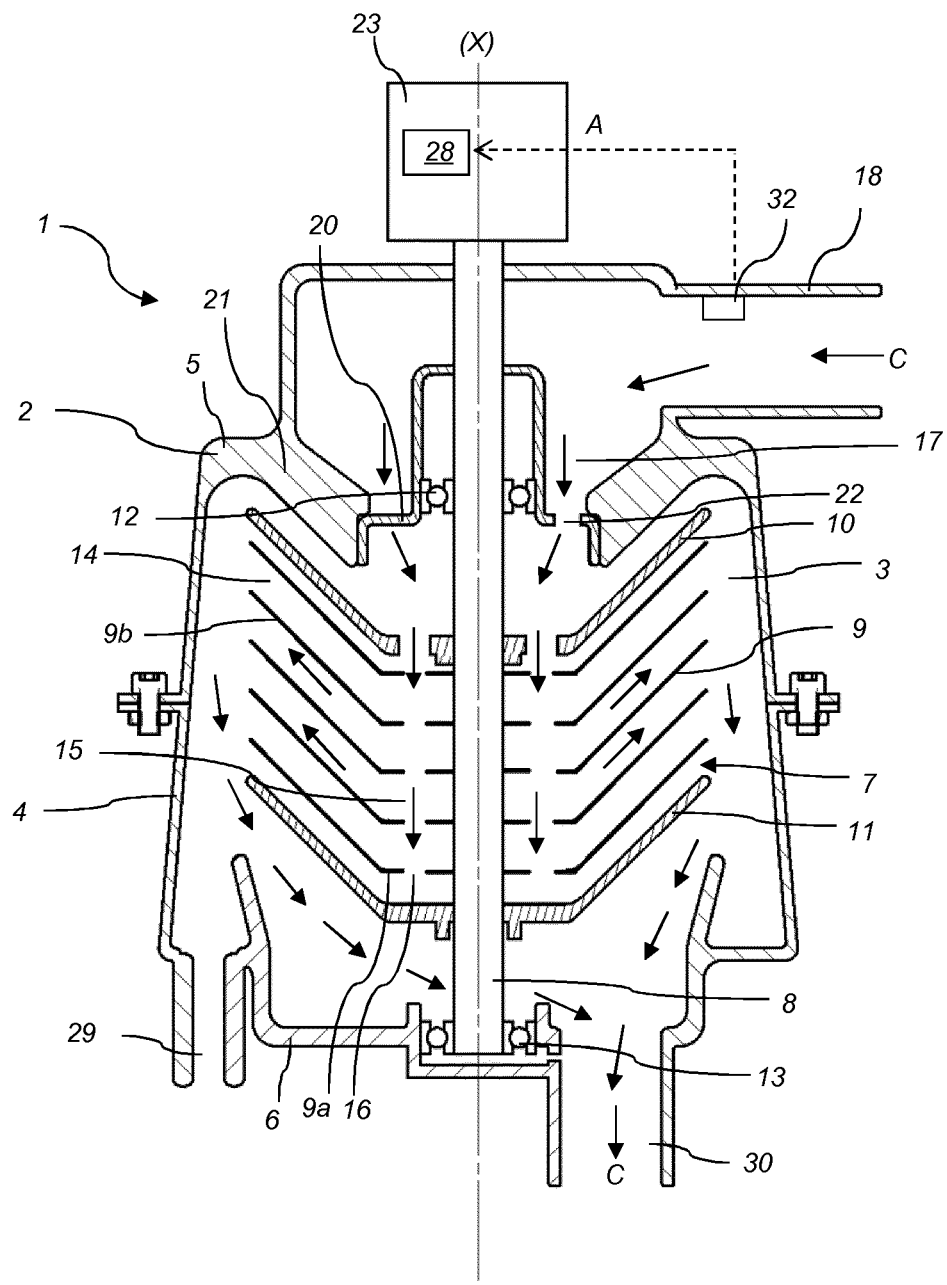
FIG. 2 shows a section of an embodiment of a centrifugal separator.

FIG. 2 shows an example of an embodiment of a centrifugal separator in which the electrical motor 23 is arranged on an extension of the spindle 8 axially above the upper wall 5 of the stationary casing 2. As an alternative, the electrical motor 23 could also be arranged on an extension of the spindle 8 axially below the lower end wall 6 of the stationary casing 2.

Thus, in the embodiment shown, the stator and the rotor of the electrical motor 23 are arranged outside the stationary casing 2. Further, the control unit 28 is arranged as a part of the electrical motor 23, but functions as discussed in relation to the embodiment shown in FIG. 1. All other functions are the same as discussed in relation to the embodiment shown in FIG. 1, i.e. the reference numerals denote the same features.

In the embodiments shown in FIG. 1 and FIG. 2, the rotating member 7 for the gas cleaning is provided with a stack of conical separation discs of a conventional kind. However, the invention is not limited to a rotating member or centrifugal rotor of precisely this kind but may be used in connection with any suitable centrifugal rotor for freeing a gas from particles suspended therein.

FIG. 3a-d shows a few examples of separation discs that may be used in a centrifugal separator of the present disclosure. For clarity reasons, only a few discs are illustrated and it is to be understood that in reality, a larger number of discs are present so that the distance between the discs is much smaller.

Figure 3A:
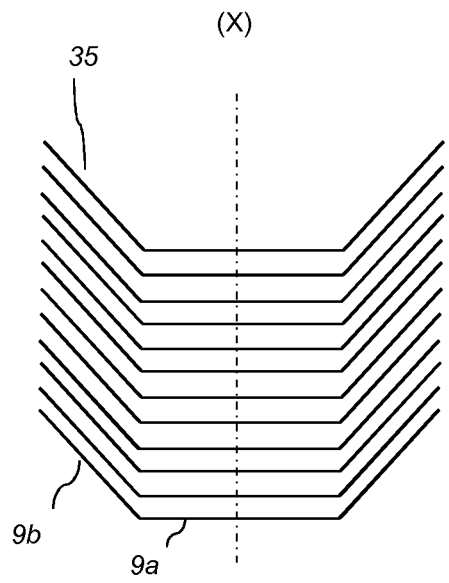
FIG. 3a-d show different types of separation members that may be used in the centrifugal separator.

FIG. 3a shows an example of frustoconical discs 35 having a planar portion 9a and a frustoconical portion 9b. The planar portion 9a extends in a plane that is perpendicular to the axis of rotation (X), and the frustoconical portion 9b extends in this embodiment upwards. The planar portion 9a is closer to the rotational axis than the frustoconical portion 9b. The planar portion 9a and/or the frustoconical portion 9b may comprise through holes for gas.

Figure 3B:
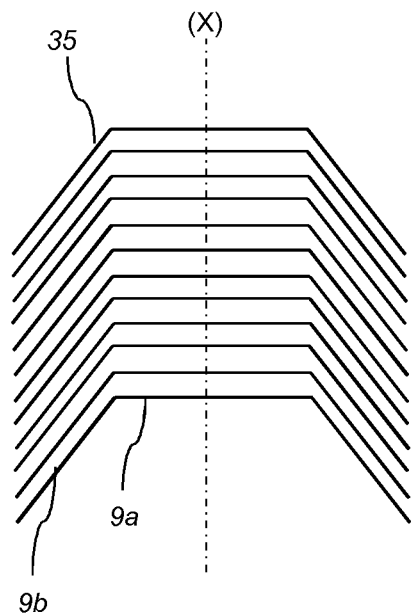

FIG. 3b shows an example of frustoconical discs 35 having a planar portion 9a and a frustoconical portion 9b. The planar portion 9a extends in a plane that is perpendicular to the axis of rotation (X), and the frustoconical portion 9b extends in this embodiment downwards. The planar portion 9a is closer to the rotational axis than the frustoconical portion 9b. The planar portion 9a and/or the frustoconical portion 9b may comprise through holes for gas.

Figure 3C:
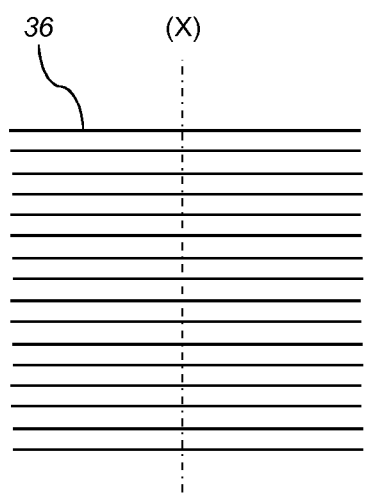

FIG. 3c shows an example of a disc stack in which all discs 36 are planar, i.e. all discs 36 extend in the plane that is perpendicular to the axis of rotation (X). The discs 36 may comprise through holes for gas.

Figure 3D:
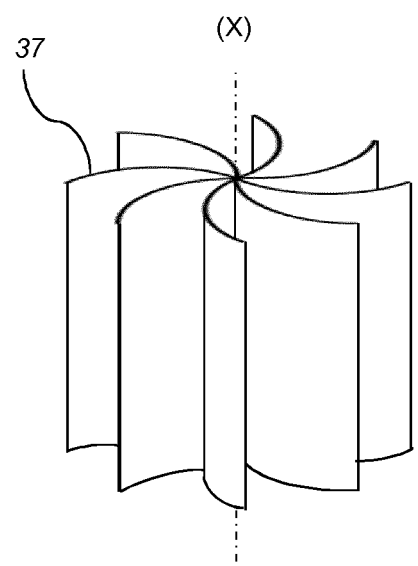

FIG. 3d shows an example of axial discs or plates 37. These plates 37 are slightly curved, i.e. they have a curved shaped as seen in a radial plane. In other words, they are curved as seen in a plane that is perpendicular to the axis of rotation (X). The axial discs 37 may comprise through holes for gas.

The invention is not limited to the embodiment disclosed but may be varied and modified within the scope of the claims set out below. The invention is not limited to the orientation of the axis of rotation (X) disclosed in the figures. The term "centrifugal separator" also comprises centrifugal separators with a substantially horizontally oriented axis of rotation.

The invention claimed is:

1. A centrifugal separator for cleaning gas containing contaminants, said centrifugal separator comprising:
   a stationary casing enclosing a separation space through which a gas flow is permitted;
   a gas inlet extending through the stationary casing and permitting supply of the gas to be cleaned;
   a rotating member comprising a plurality of separation members arranged in said separation space and being arranged to rotate around an axis of rotation;
   a gas outlet configured to permit discharge of cleaned gas and comprising an outlet opening through a wall of the stationary casing;
   a drainage outlet configured to permit discharge of liquid impurities separated from the gas to be cleaned;
   an electrical motor for rotating the rotating member; and
   a control unit configured to:
   receive a signal regarding at least one internal parameter of the electrical motor; and
   control the operation of the electrical motor and to drive the electrical motor in one of at least two different operational modes and to further switch between the at least two operational modes depending on the at least one internal parameter of the electrical motor, each operational mode having a different constant speed or constant torque.

2. The centrifugal separator according to claim 1, wherein the at least two different operational modes are at least two different driving modes of the electrical motor in which either the torque or the rotational speed of the electrical motor is kept at different constant levels.

3. The centrifugal separator according to claim 2, wherein the at least two different driving modes comprises at least two different speed levels in which the rotational speed is kept at different constant levels.

4. The centrifugal separator according to claim 3, wherein the at least two different driving modes comprises a first speed level at a first constant rotational speed and a second speed level at a second constant rotational speed,
   wherein the second constant rotational speed is higher than the first constant rotational speed, and
   wherein the control unit is configured to switch to said second speed level if the at least one measured internal parameter indicates that there is an increase in demand for cleaning the gas when running at the first speed level.

5. The centrifugal separator according to claim 4, wherein the at least two different driving modes further comprises a third speed level at a third constant rotational speed,
   wherein the third constant rotational speed is lower than the first constant rotational speed, and
   wherein the control unit is configured to switch to said third speed level if the at least one measured internal parameter indicates that there is a decrease in demand for cleaning the gas when running at the first speed level.

6. The centrifugal separator according to claim 2, wherein the at least two different driving modes comprises at least two different torque levels in which the torque of the electrical motor is kept at different constant levels.

7. The centrifugal separator according to claim 1, wherein at least one measured internal parameter of the electrical motor is the electric power consumption of the electrical motor or the electric current through the electrical motor.

8. The centrifugal separator according to claim 1, wherein at least one measured internal parameter of the electrical motor is the temporal fluctuations of the electric current through the electrical motor.

9. The centrifugal separator according to claim 1, wherein at least one measured internal parameter of the electrical motor is the temperature of the electrical motor.

10. The centrifugal separator according to claim 1, wherein at least one measured internal parameter of the electrical motor is the time from startup of the electrical motor.

11. The centrifugal separator according claim 1, wherein the control unit is further adapted to switch between operational modes depending at least on information from at least one measured internal parameter of the electrical motor and on information of at least one external parameter that is independent of functions of the electrical motor.

12. The centrifugal separator according to claim 11, wherein at least one external parameter is selected from the pressure at the gas inlet or the temperature of the gas inlet.

13. A method for cleaning gas comprising contaminants, comprising the steps of:
providing the centrifugal separator according to claim 1;
running the centrifugal separator by driving the electrical motor in a first operational mode;
measuring at least one internal parameter of the electrical motor; and
switching the electrical motor to drive in a second operational mode depending at least on information of the least one measured internal parameter of the electrical motor.

14. The method according to claim 13, further comprising switching back to driving in said first operational mode depending at least on information of the least one measured internal parameter of the electrical motor.

15. The method according to claim 13, wherein a step of switching to another operational mode also depends on information of at least one external parameter that is independent of functions of the electrical motor.

16. The centrifugal separator according to claim 1, wherein the engine further comprises a first sensor for measuring the at least one measured internal parameter of the electrical motor, the first sensor sending signals to the control unit, and
wherein the sensor measure one of temporal fluctuations of the electric current through the electrical motor and a temperature of the electric motor.

17. The centrifugal separator according to claim 16, further comprising a second sensor spaced remote form the electric motor, the second sensor sending signals to the control unit.

18. The centrifugal separator according to claim 17, wherein the second sensor is located at the gas inlet, and
wherein the second sensor measures one of a pressure at the gas inlet or a temperature of the gas inlet.

19. The centrifugal separator according to claim 1, further comprising a second sensor spaced remote form the electric motor, the second sensor sending signals to the control unit.

20. The centrifugal separator according to claim 19, wherein the second sensor is located at the gas inlet, and
wherein the second sensor measures one of a pressure at the gas inlet or a temperature of the gas inlet.

* * * * *